(12) United States Patent
Wei et al.

(10) Patent No.: US 11,270,140 B2
(45) Date of Patent: Mar. 8, 2022

(54) ILLEGAL ATTACK PREVENTION

(71) Applicant: HANGZHOU HIKVISION DIGITAL TECHNOLOGY CO., LTD., Hangzhou (CN)

(72) Inventors: Fan Wei, Hangzhou (CN); Shaojie Ding, Hangzhou (CN); Congyi Hua, Hangzhou (CN); Weichang Kang, Hangzhou (CN); Chuan Shen, Hangzhou (CN)

(73) Assignee: HANGZHOU HIKVISION DIGITAL TECHNOLOGY CO., LTD.

( * ) Notice: Subject to any disclaimer, the term of this patent is extended or adjusted under 35 U.S.C. 154(b) by 15 days.

(21) Appl. No.: 17/049,873

(22) PCT Filed: Jan. 25, 2019

(86) PCT No.: PCT/CN2019/073094
§ 371 (c)(1),
(2) Date: Oct. 22, 2020

(87) PCT Pub. No.: WO2019/214295
PCT Pub. Date: Nov. 14, 2019

(65) Prior Publication Data
US 2021/0241012 A1   Aug. 5, 2021

(30) Foreign Application Priority Data

May 9, 2018  (CN) .......................... 201810437289.1

(51) Int. Cl.
*G06K 9/00* (2006.01)
(52) U.S. Cl.
CPC ..... *G06K 9/00906* (2013.01); *G06K 9/00275* (2013.01); *G06K 9/00899* (2013.01)

(58) Field of Classification Search
CPC .......... G06K 9/00906; G06K 9/00275; G06K 9/00899
See application file for complete search history.

(56) References Cited

U.S. PATENT DOCUMENTS

| 2002/0191817 A1* | 12/2002 | Sato | ......................... G07C 9/37 |
| | | | 382/118 |
| 2007/0041620 A1* | 2/2007 | Ito | ........................... G06K 9/00 |
| | | | 382/115 |

(Continued)

FOREIGN PATENT DOCUMENTS

| CN | 105096420 | 11/2015 |
| CN | 105320939 | 2/2016 |

(Continued)

OTHER PUBLICATIONS

CN Office Action issued in Chinese Application No. 201810437289. 1, dated Dec. 21, 2020, 13 pages (With English Translation).

(Continued)

*Primary Examiner* — Thomas D Alunkal
(74) *Attorney, Agent, or Firm* — Fish & Richardson P.C.

(57) ABSTRACT

Provided are a method and apparatus for preventing an illegal attack, and an electronic device. According to one embodiment, the method comprises: when a user feature of a user is identified successfully, determining whether a living body detection result for the user feature indicates failure; if the living body detection result for the user feature indicates failure, locking a feature ID when the feature ID of the user feature is not locked and a locking condition of the feature ID is satisfied currently; and if the living body detection result for the user feature indicates success, unlocking the feature ID when the feature ID of the user feature is locked and an unlocking condition of the locked feature ID is satisfied currently.

14 Claims, 3 Drawing Sheets

(56) References Cited

U.S. PATENT DOCUMENTS

| | | | | |
|---|---|---|---|---|
| 2010/0299530 | A1* | 11/2010 | Bell | G06F 21/32 713/186 |
| 2012/0090015 | A1* | 4/2012 | Abe | G06F 21/32 726/2 |
| 2016/0063314 | A1* | 3/2016 | Samet | G06K 9/00268 348/78 |
| 2016/0092665 | A1* | 3/2016 | Cowan | G06F 21/32 726/9 |
| 2017/0032601 | A1* | 2/2017 | Zhou | G07C 9/37 |
| 2018/0276488 | A1* | 9/2018 | Yoo | G06K 9/00275 |

FOREIGN PATENT DOCUMENTS

| | | |
|---|---|---|
| CN | 105447443 | 3/2016 |
| CN | 205140028 | 4/2016 |
| CN | 105825562 | 8/2016 |
| CN | 105989264 | 10/2016 |
| CN | 106296920 | 1/2017 |
| CN | 106570489 | 4/2017 |
| CN | 106778525 | 5/2017 |
| CN | 106778607 | 5/2017 |
| CN | 106846577 | 6/2017 |
| CN | 107086985 | 8/2017 |
| EP | 2443532 | 4/2012 |
| GB | 2549371 | 10/2017 |

OTHER PUBLICATIONS

Extended European Search Report issued in European Application No. 19799856.0, dated Mar. 25, 2021, 8 pages.

PCT Preliminary Report on Patentability in International Application No. PCT/CN2019/073094, dated Nov. 10, 2020, 9 pages (With English Translation).

Chinese Office Action issued in Chinese Application No. 201810437289.1 dated Apr. 15. 2020, 14 pages (With English Translation).

PCT International Search Report in International Application No. PCT/CN2019/073,094, dated Apr. 24, 2019, 6 pages (With English Translation).

* cited by examiner

ILLEGAL ATTACK PREVENTION

CROSS-REFERENCE TO RELATED APPLICATIONS

The disclosure is a National Stage of International Application No. PCT/CN2019/073094, having an International Filing Date of Jan. 25, 2019, which claims priority to Chinese Patent Application No. 201810437289.1, entitled "a method and an apparatus for preventing illegal attack, and an electronic device", filed on May 9, 2018, the entire contents of which are incorporated herein by reference.

TECHNICAL FIELD

The present disclosure relates to biometric identification technologies, and more particularly to anti-illegal attack.

BACKGROUND

In the biometric identification system, in order to prevent an attacker from counterfeiting and stealing other user feature (also referred to as biometric information) for passing identity authentication, usually living body detection is to be performed on the user feature. The living body detection is mainly performed by detecting whether the user feature is obtained from a legitimate user with a biometric living body.

The current living body detection is not optimal and has the possibility of misjudgment. For example, when the living body detection on the user feature provided by the attacker is failed, the misjudgment will occurs if the attacker passes the living body detection by the attacker attempting the living body detection for a plurality of times subsequently.

SUMMARY

The present disclosure provides a method and an apparatus for preventing illegal attack, and an electronic device, so as to prevent misjudgment of user feature provided by an attacker from passing through identity authentication and improve security.

The technical solutions provided by the present disclosure include:

A method of preventing illegal attack, which includes: when a user feature of a user is successfully identified, determining whether a living body detection result for the user feature indicates a failure or not; in a case where the living body detection result for the user feature indicates failure, when a feature ID of the user feature is not locked and a locking condition of the feature ID is satisfied currently, locking the feature ID; and in a case where the living-body detection result for the user feature indicates success, when the feature ID of the user feature is locked and an unlocking condition of the locked feature ID is satisfied currently, unlocking the locked feature ID.

An apparatus for preventing illegal attack, which includes: a feature identifying module configured to identify a user feature of a user; a living body detecting module configured to perform a living body detection on the user feature; a processing module configured to: in a case where the feature identifying module successfully identifies the user feature of the user, and the living body detecting module indicates failure for detecting the user feature, when a feature ID of the user feature is not locked and a locking condition of the feature ID is satisfied currently, lock the feature ID; and in a case where the feature identifying module successfully identifies the user feature of the user, and the living body detecting module successfully detects the user feature, when the feature ID of the user feature is locked and an unlocking condition of the locked feature ID is satisfied currently, unlock the locked feature ID.

An electronic device, which includes: an internal bus, a memory, a processor and a communication interface; wherein the processor, the communication interface and the memory communicate with each other via the internal bus. The memory is configured to store machine executable instructions corresponding to the method of preventing an illegal attack. The processor is configured to read the machine executable instructions stored in the memory, and execute the instructions to implement the method of preventing an illegal attack.

From the above technical solutions, in the present disclosure, when the feature ID of the user feature for which the living body detection indicates failure satisfies the locking condition, the feature ID is locked. In this way, even if the living body detection is successfully discovered when the user feature attempts to detect the living body subsequently, it is not directly determined that the user feature passes the identity authentication, but it is detected whether the feature ID satisfies the unlocking condition, and the feature ID is unlocked first when the unlocking condition is satisfied, and then the user feature attempts to detect the living body. Only if the live body detection succeeds at this time, it is determined that the user feature passes the identity authentication. Therefore, the technical solutions of the present disclosure can effectively prevent misjudgment of the user features provided by an attacker from passing through identity authentication, further reduce the possibility of illegal attack, thereby effectively improving security.

BRIEF DESCRIPTION OF THE DRAWINGS

The accompanying drawings herein are incorporated in and constitute a part of this description, illustrate embodiments consistent with the present disclosure, and together with the description serve to explain the principles of the present disclosure.

DETAILED DESCRIPTION OF THE EMBODIMENTS

Hereinafter, the technical solutions in the embodiments of the present disclosure will be described clearly and completely with reference to the accompanying drawings in the embodiments of the present disclosure. Obviously, the described embodiments are merely a part of the embodiments of the present disclosure, rather than all of the embodiments. Based on the embodiments of the present disclosure, all other embodiments obtained by a person of ordinary skill in the art without creative efforts all belong to the scope of protection of the present disclosure.

Once the misjudgment occurs if the living body detection of the attacker is successful, it means that the user feature provided by the attacker passes the identity authentication, and the attacker may access the resources which may be accessed only with the legal identity. For example, in the field of access control, when an access control device determines that the attacker passes the identity authentication, the access control of the access control device will be released to allow the attacker to pass through, which provides an illegitimate attack of the attacker, reducing the security.

In the present disclosure, when a living body detection performed based on a user feature indicates failure, if a locking condition of a feature ID (abbreviation for "identity" or "identification") corresponding to the user feature is satisfied currently, the feature ID is locked. As such, even if one misjudgment occurs when the living body detection of the user feature corresponding to the locked feature ID is successfully detected, the identity authentication is not immediately passed, but it is determined whether the unlocking condition of the locked feature ID is satisfied currently. Even when the unlocking condition of the feature ID is satisfied, it is not immediately determined that the identity authentication is passed, merely unlocking the feature ID. This may effectively prevent an attacker from initiating an illegal attack due to misjudgment, greatly improving the security.

In order to make the present disclosure more clear, the present disclosure is described below in conjunction with specific embodiments.

Figure 1:
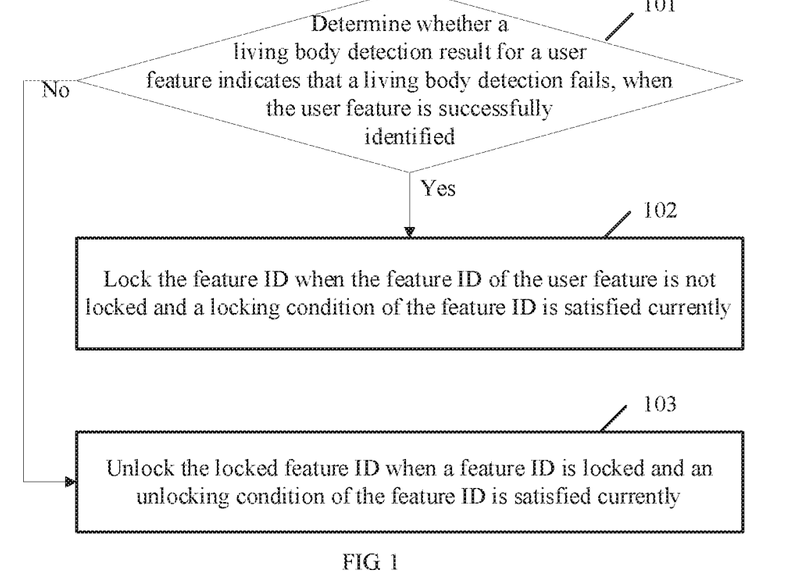
FIG. 1 is a flowchart of a method according to an embodiment of the present disclosure.

FIG. 1 is a flowchart of a method according to an embodiment of the present disclosure. The method in the present disclosure may be applicable in various fields, such as a field of access control, which is not specifically limited therein. Taking the method in the present disclosure applicable to the field of access control as an example, the method may be applicable to an access control device. Other fields are similar, and are not further exemplified.

As shown in FIG. 1, the following steps may be included.

Step 101, when a user feature of a user is successfully identified, it is determined whether a living body detection result for the user feature indicates that a living body detection fails or not. When the living body detection result for the user feature indicates a failure on the living body detection, Step 102 is performed. When the living-body detection result for the user feature indicates that the living-body detection succeeds, Step 103 is performed.

In an embodiment of the present disclosure, the user feature may be a biometric feature of the user, such as a face, an iris, a fingerprint, or a palm print, which is not particularly limited herein.

In the present disclosure, the identification technology of the user feature is a known identification technology to a person skilled in the art. Taking the user's face as the user feature for an example, in the present disclosure, the identification for the user's face may use any human face identification technology known to a person skilled in the art. Taking the feature of the user as an example, in the present disclosure, the identification for the user's iris may use any iris identification technology known to a person skilled in the art.

In an implementation, two kinds of results may occur when the user feature of the user is identified, one is that the identification succeeds, and the other one is that the identification fails. The flowchart shown in FIG. 1 of the present disclosure is performed on the premise that the user feature is successfully identified. However, once the user feature identification fails, it may be directly determined that the user feature fails to pass the identity authentication, and the method shown in FIG. 1 of the present disclosure is not required to be performed.

Step 102, the feature ID is locked when the feature ID of the user feature is not locked and a locking condition of the feature ID is satisfied currently.

This step 102 is performed on the premise of successfully identifying the user feature of the user, and a living body detection result for the user feature indicates a failure. Based on this premise, in the present disclosure, there are many implementations for detecting whether the locking condition of the feature ID is satisfied currently, and FIG. 2 below illustrates one implementation therefor, which is not described herein. In the present disclosure, each user feature has a unique feature ID. In a specific implementation, the feature ID may be a sequence number or an account number. For example, taking a human face as an example, a feature ID in the present disclosure corresponding to the human face is 00001, and 00001 may represent the human face.

In step 102, if it is detected that the locking condition of the feature ID is not satisfied, the lock operation is not performed on the feature ID.

Step 103, the locked feature ID is unlocked when the feature ID is locked and an unlocking condition of the feature ID is satisfied currently.

This step 103 is performed on the premise of successfully identifying the user feature of the user and the living body detection result for the user feature indicates the living body detection succeeds. Based on the premise, as an example, if the living body detection result for the user feature indicates that the living body detection is successful and the feature ID of the user feature is found to be not locked, it may be directly determined that the user feature passes the identity authentication.

In the present disclosure, there are many implementations for detecting whether the unlocking condition of the feature ID is satisfied currently, and FIG. 3 below illustrates one implementation therefor, which is not described herein.

So far, the method shown in FIG. 1 is described above.

From the flowchart shown in FIG. 1 it can be seen that, in the present disclosure, on the premise of successfully identifying the user feature of the user, if the living body detection for the user feature indicates failure, the feature ID is locked when the locking condition for locking the feature ID of the user feature is satisfied currently. In this way, when attempting the living body detection on the user feature subsequently, even if the living body detection succeeds, it is not directly determined that the user feature passes the identity authentication. Instead, it is detected whether the unlocking condition of the feature ID is satisfied currently, and when the unlocking condition is satisfied, the locked feature ID is unlocked first, and the living body detection on the user feature then is attempted. In this case, if the live body detection is successful, it is determined that the user feature passes the identity authentication. This may effectively prevent the user feature provided by the attacker from passing through identity authentication and further reduce the possibility of illegal attack, thereby improving security.

The locking condition for detecting whether the feature ID is satisfied currently is described below.

Figure 2:
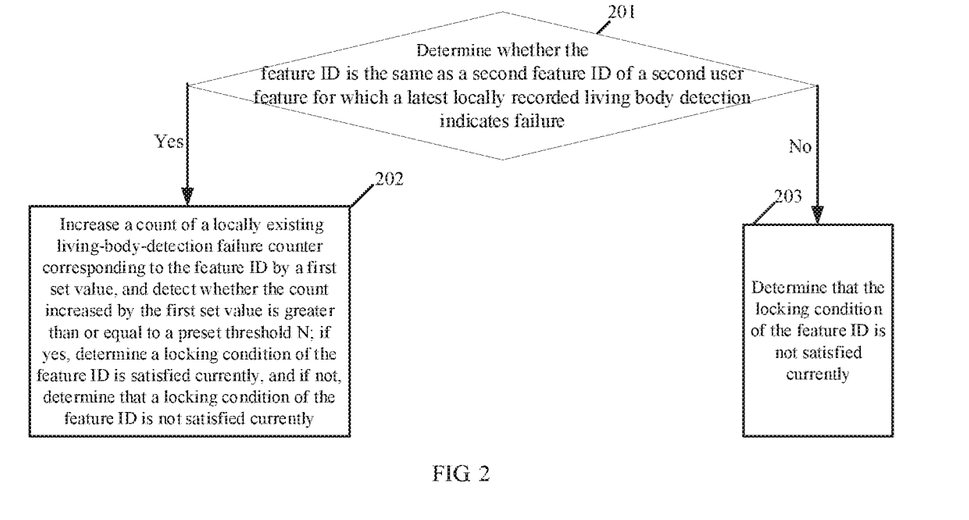
FIG. 2 is a flowchart of detecting whether a locking condition of a feature ID is satisfied currently according to an embodiment of the present disclosure.

FIG. 2 is a flowchart of detecting whether the locking condition of the feature ID is satisfied currently according to an embodiment of the present disclosure.

As shown in FIG. 2, the method may include the following steps.

Step 201, it is determined whether the feature ID is the same as a second feature ID of a second user feature for which a latest locally recorded living body detection indicates failure; if yes, step 202 is performed, and if not, step 203 is performed.

In the present disclosure, the live body detection performed on the user feature each time is recorded locally. Based on this, it is easy to determine, according to the local record, whether the feature ID is the same as the second feature ID of the second user feature for which a latest locally recorded living body detection indicates failure.

The purpose for determining whether the feature ID is the same as the second feature ID is, determining whether living body detections on the user feature indicate failure continuously, which will be described in step 202 below.

Step 202, a count of a locally existing living-body-detection failure counter corresponding to the feature ID is increased by a first set value, and it is detected whether the count increased by the first set value is greater than or equal to a preset threshold N; if yes, it is determined a locking condition of the feature ID is satisfied currently, and if not, it is determined that a locking condition of the feature ID is not satisfied currently.

Step 202 is performed on the premise of determining that a current feature ID is the same as the second feature ID of the second user feature for which a latest locally recorded living body detection indicates failure. Where, If the current feature ID is the same as the second feature ID of the second user feature for which a latest locally recorded living body detection indicates failure, it means that in the last time a living body detection is also performed on the user feature corresponding to the feature ID and its living body detection result indicates a failure (equivalent to at least two living body detection failures continuously performed on the user feature corresponding to the feature ID), In this case, the count of the living-body-detection failure counter corresponding to the feature ID may be directly increased by the first set value. The first set value here may be set to, for example, 1. As an embodiment, the first set value here is smaller than the preset threshold N.

From step 202 it can be seen that, in the present disclosure, when at least N living body detections performed continuously on a user feature corresponding to the feature ID fail, it is determined that a locking condition for locking the feature ID is satisfied, and in other cases, it is determined that the locking condition for locking the feature ID is not satisfied currently.

Step 203, it is determined that the locking condition of the feature ID is not satisfied currently.

Step 203 is performed on the premise that the current feature ID is different from the second feature ID of the second user feature for which a latest locally recorded living body detection indicates failure. Where, if the current feature ID is different from the second feature ID of the second user feature for which a latest locally recorded living body detection indicates failure, it means that the living body detection is not performed for the user feature corresponding to the feature ID last time (equivalent to the case where the living body detection is not performed continuously on the user feature corresponding to the feature ID). In other words, it may be determined whether it is the first time to perform living body detection on the user feature corresponding to the feature ID or not.

As an example, in the present disclosure, determining whether it is the first time to perform living body detection on the user feature corresponding to the feature ID, may be realized by detecting whether a living-body-detection failure counter corresponding to the feature ID locally exists.

When it is detected that the living-body-detection failure counter corresponding to the feature ID does not exist locally, it is determined that the living body detection is performed on the user feature corresponding to the feature ID for the first time. In this case, the living-body-detection failure counter may be newly established locally, and the count of the living-body-detection failure counter is set to a second set value. Here, the second set value may be set to, for example, 1.

When it is detected that the living-body-detection failure counter corresponding to the feature ID exists in local, it is determined that the living body detection is not performed on the user feature corresponding to the feature ID for the first time. In this case, the count of the living-body-detection failure counter may be set to a second set value. The second set value is described above, and in an example may be set to 1. The purpose of setting the count of the living-body-detection failure counter to a second set value is to record the number of times that the living-body-detection failures are continuously performed on the user feature corresponding to the feature ID.

So far, the method shown in FIG. 2 is described above.

The method shown in FIG. 2 describes detecting whether the locking condition of the feature ID is satisfied currently.

The following describes how to detect whether the unlocking condition of the feature ID is satisfied currently.

Figure 3:
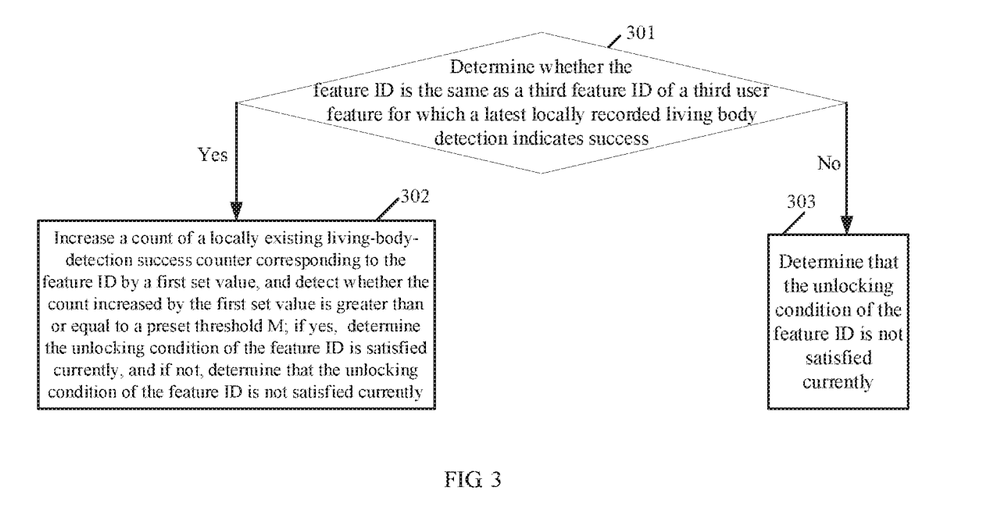
FIG. 3 is a flowchart of detecting whether an unlocking condition of a feature ID is satisfied currently according to an embodiment of the present disclosure.

FIG. 3 is a flowchart of detecting whether an unlocking condition of the feature ID is satisfied currently according to an embodiment of the present disclosure.

As shown in FIG. 3, the method may include the following steps.

Step 301, it is determined whether the feature ID is the same as a third feature ID of a third user feature for which a latest locally recorded living body detection indicates success; if yes, step 302 is performed, and if not, step 303 is performed.

In the present disclosure, the live body detection performed on the user feature each time is recorded locally. Based on this, it is easy to determine, according to the local record, whether the feature ID is the same as the third feature ID of the third user feature for which a latest locally recorded living body detection indicates success.

The purpose for determining whether the feature ID is the same as the second feature ID of the second user feature for which a latest locally recorded living body detection indicates failure is, determining whether living body detections on the user feature succeeds continuously.

Step 302, a count of a locally existing living-body-detection success counter corresponding to the feature ID is increased by a first set value, and it is detected whether the count increased by the first set value is greater than or equal to a preset threshold M; if yes, it is determined the unlocking condition of the feature ID is satisfied currently, and if not, it is determined that the unlocking condition of the feature ID is not satisfied currently.

Step 302 is performed on the premise of determining that the current feature ID is the same as the third feature ID of the third user feature for which a latest locally recorded living body detection indicates success. Where, If the current feature ID is the same as the third feature ID, it means that in the last time a living body detection is also performed on the user feature corresponding to the feature ID and its living body detection result indicates a success (equivalent to at least two living body detection successes continuously performed on the user feature corresponding to the feature ID), In this case, the count of the living-body-detection success counter corresponding to the feature ID may be directly increased by the first set value. The first set value here may be set to, for example, 1. As an embodiment, the first set value here is smaller than the preset threshold M.

From step 302 it can be seen that, in the present disclosure, when at least M living body detections performed on a user feature corresponding to the locked feature ID succeed, it is determined that the unlocking condition for unlocking the feature ID is satisfied, and in other cases, it is determined that the unlocking condition for unlocking the feature ID is not satisfied.

Step 303; it is determined that the unlocking condition of the feature ID is not satisfied currently.

Step 303 is performed on the premise that the current feature ID is different from the third feature ID of the third user feature for which a latest locally recorded living body detection indicates success. Where, if the current feature ID is different from the third feature ID, it means that the live body detection is not performed for the user feature corresponding to the feature ID last time (equivalent to the case where the live body detection is not performed continuously for the user feature corresponding to the feature ID currently). Based on this, it may be determined whether it is the first time to perform living body detection on the user feature corresponding to the feature ID after the feature ID is locked, or not.

As an embodiment, in the present disclosure, determining whether it is the first time to perform living body detection on the user feature corresponding to the feature ID after the feature ID is locked, may be realized by detecting whether a living-body-detection success counter corresponding to the feature ID locally exists.

When it is detected that the living-body-detection success counter corresponding to the feature ID does not exist in local, it is determined that the living body detection is performed on the user feature corresponding to the feature ID for the first time after the feature ID is locked. In this case, the living-body-detection success counter may be newly created locally, and the count of the living-body-detection success counter is set to a second set value. Here, the second set value may be, for example, 1.

When it is detected that there is a locally living-body-detection success counter corresponding to the feature ID, it is determined that the living body detection is not performed on the user feature corresponding to the feature ID for the first time after the feature ID is locked. In this case, the count of the living-body-detection success counter may be set to a second set value. The second set value is described above, and in an example may be set to 1. The purpose of setting the count of the living-body-detection success counter to a second set value is to record the number of times that the living-body-detection successes are continuously performed on the user feature corresponding to the feature ID after locking the feature ID.

So far, the method shown in FIG. 3 is described above.

The method shown in FIG. 3 describes detecting whether the unlocking condition of the feature ID is satisfied currently.

In step 103 of the present disclosure, after a feature ID is locked, the method further includes starting a timer corresponding to the feature ID.

In step 103 of the present disclosure, if it is found that a feature ID of the user feature is locked, the method may further include, resetting a timer corresponding to the feature ID.

In an embodiment of the present disclosure, the timer decrements from the maximum timing T after being started, and instructs to unlock the feature ID when decrementing to the first set time threshold. When the timer corresponding to the feature ID is decremented to the first set time threshold, regardless of whether the user feature corresponding to the feature ID is currently identified and living body detection is performed, and regardless of whether the identification result of the user feature corresponding to the feature ID is successfully or unsuccessfully identified, and the detection result (success or failure) of the user feature corresponding to the feature ID, it is necessary to perform unlocking on the feature ID. In another embodiment, the timer may also be incremented from a specific value, for example, 0 after being started, and instructs to unlock the feature ID when being incremented to a second set time threshold.

Figure 4:
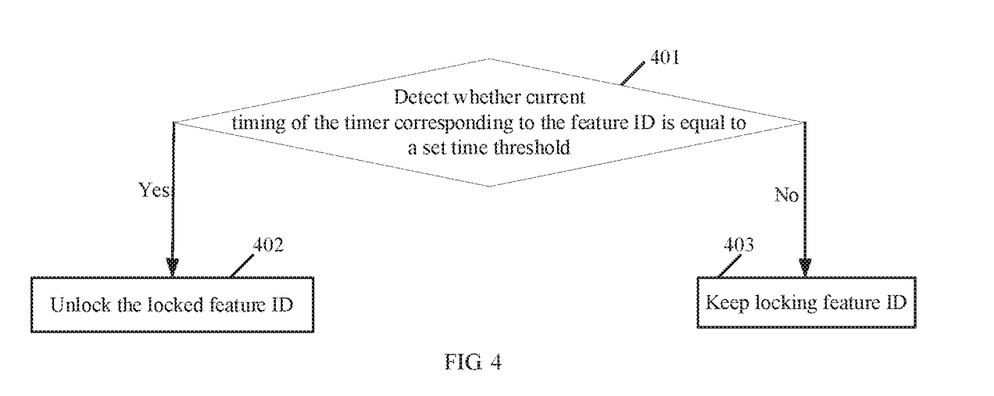
FIG. 4 is a flowchart of a timer according to an embodiment of the present disclosure.

On this basis, the present disclosure further performs the following steps shown in FIG. 4.

Step 401, it is detected whether current timing of the timer corresponding to the feature ID is equal to a set time threshold; if yes, step 402 is performed, and if not, step 403 is performed.

Here, as an example, the set time threshold may be 0.

Step 402, the locked feature ID is unlocked.

Step 403, feature ID is kept locking.

So far, the method shown in FIG. 4 is described above.

In the present disclosure, after the feature ID is unlocked in step 103, the method may further include, closing or deleting the timer corresponding to the feature ID, so as to prevent the timer corresponding to the feature ID from being in a working state after the feature ID is unlocked, thereby saving resources.

Figure 5:
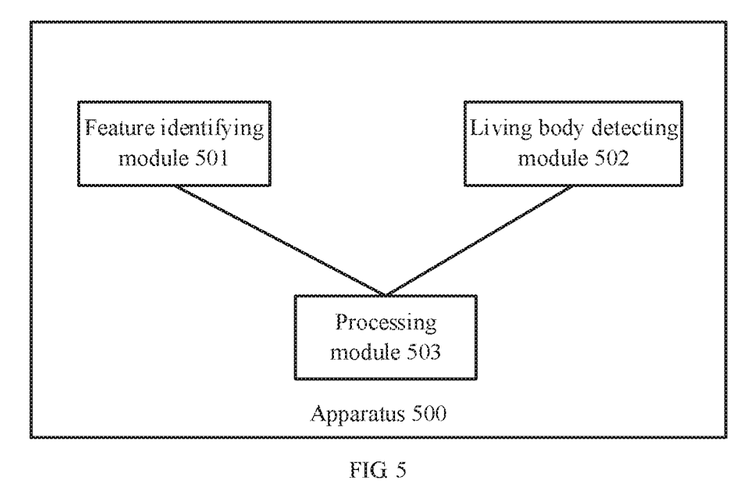
FIG. 5 is a schematic structural diagram of an apparatus according to an embodiment of the present disclosure.

The method provided by the present disclosure is described above. The apparatus provided in the present disclosure is described below FIG. 5 is a structural diagram of an apparatus 500 according to an embodiment of the present disclosure. As shown in FIG. 5, the apparatus 500 may include a feature identifying module 501, a living body detecting module 502 and a processing module 503.

The feature identifying module 501 is configured to identify a user feature of a user.

The living body detecting module 502 is configured to perform a living body detection on the user feature;

The processing module 503 is configured to, in a case where the feature identifying module 501 successfully identifies the user feature and the living body detecting module 502 indicates failure for detecting the user feature, when a feature ID of the user feature is not locked and a locking condition of the feature ID is satisfied currently, lock the feature ID; and, in a case where the feature identifying module 501 successfully identifies the user feature and the living body detecting module 502 successfully detects the user feature, i when a feature ID of the user feature is locked and an unlocking condition of the locked feature ID is satisfied currently, unlock the locked feature ID.

In an example, the processing module 503 configured to determine whether the locking condition of the feature ID is satisfied currently, is further configured to: determine whether the feature ID is the same as a second feature ID of a second user feature for which a latest locally recorded living body detection indicates failure;

when the feature ID is different from the second feature ID, determine that the locking condition of the feature ID is not satisfied;

when the feature ID is the same as the second feature ID, increase a count of a locally existing living-body-detection failure counter corresponding to the feature ID by a first set value, to obtain an updated count of the living-body-detection failure counter; when detecting that the updated count is greater than or equal to a preset threshold N, determine that the locking condition of the feature ID is satisfied currently; when the updated count is less than the first preset threshold, determine that the locking condition of the feature ID is not satisfied currently.

In an example, the processing module 503 is further configured to detect whether a living-body-detection failure counter corresponding to the feature ID locally exists, when the feature ID is different from the second feature ID for which a latest locally recorded living body detection indicates failure, if the living-body-detection failure counter does not locally exist, establish locally the living-body-detection failure counter corresponding to the feature ID, and set a count of the living-body-detection failure counter to a second set value;

If the living-body-detection failure counter locally exists, set the count of the living-body-detection failure counter corresponding to the feature ID to the second set value.

In an example, the processing module 503 configured to detect whether the unlocking condition of the feature ID is satisfied currently, is further configured to:

determine whether the feature ID is the same as a third feature ID of a third user feature for which a latest locally recorded living body detection indicates success;

if determining that the feature ID is different from the third feature ID of the third user feature, determine that the unlocking condition of the feature ID is not satisfied;

if determining that the feature ID is the same as the third feature ID of the third user feature, increase a count of a locally existing living-body-detection success counter corresponding to the feature ID by a first set value, to obtain an updated count of the living-body-detection success counter; when the updated count is greater than or equal to a preset threshold M, determine that the unlocking condition of the feature ID is satisfied currently; when the updated count is less than the preset threshold M, determine that the unlocking condition of the feature ID is not satisfied currently.

In an example, the processing module 503 is further configured to detect whether a living-body-detection success counter corresponding to the feature ID locally exists, when the feature ID is different from the third feature ID of the third user feature for which a latest locally recorded living body detection indicates success;

when the living-body-detection success counter does not locally exist, establish locally the living-body-detection success counter corresponding to the feature ID, and set a count of the living-body-detection failure counter to a second set value;

when the living-body-detection success counter locally exists, set the count of the living-body-detection success counter corresponding to the feature II) to the second set value.

In an example, the processing module 503 is further configured to: start a timer corresponding to the feature ID after locking the feature ID. The timer decrements from the maximum timing T after being started, and instructs to unlock the feature ID when decrementing to the first set time threshold. Alternatively, the timer may also be incremented from a specific value, for example, 0 after being started, and instructs to unlock the feature ID when being incremented to a second set time threshold.

the processing module 503 is further configured to: reset the timer corresponding to the feature ID when the feature identifying module 501 successfully identities the user feature of the user, the living body detection of the living body detecting module 502 indicates failure, and the feature ID of the user feature is locked.

The processing module 503 is further configured to turns off or deletes the timer corresponding to the feature ID, after unlocking the feature ID.

So far, the structure of the apparatus 500 shown in FIG. 5 is described above.

Figure 6:
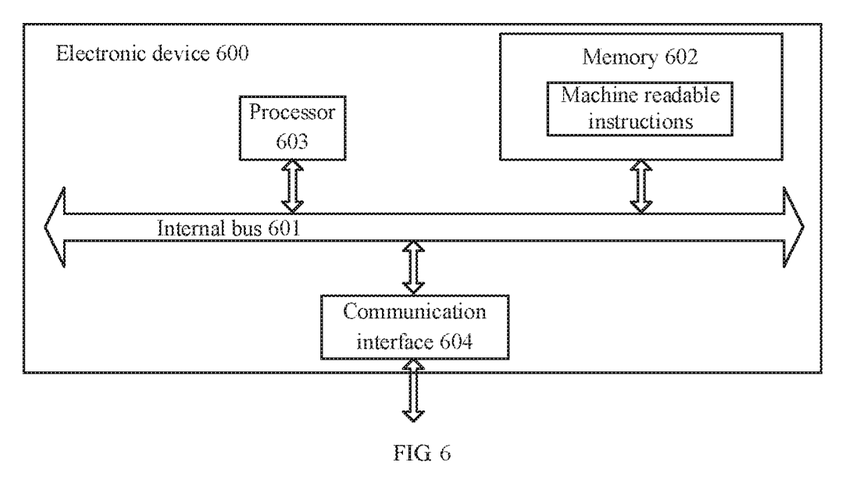
FIG. 6 is a schematic structural diagram of an electronic device according to an embodiment of the present disclosure.

Corresponding to the method embodiments, an electronic device 600 is also provided according to the embodiments of the present disclosure. In practical applications, the electronic device 600 may be an access control device or the like, which is not specifically limited in the present disclosure.

As shown in FIG. 6, the electronic device 600 includes an internal bus 601, a memory 602, a processor 603, and a communication interface 604. The processor 603, the communication interface 604 and the memory 602 communicate with each other through the internal bus 601.

The memory 602 is configured to store machine readable instructions corresponding to the method of preventing an illegal attack.

The processor 603 is configured to read the machine readable instructions stored in the memory 602, and execute the instructions to implement an anti-illegal attack method.

In the embodiments, reference may be made to the description of the method embodiment provided in the present disclosure for the related description of the anti-illegal attack method, and details are not described herein.

So far, the structure of the electronic device 600 provided by the present disclosure is described above.

For the apparatus embodiment, since the apparatus substantially corresponds to the method embodiment, reference may be made to a part of the description of the method embodiment. The apparatus embodiments described above are merely schematic, in which the units described as separate components may or may not be physically separate, and the components displayed as units may or may not be physical units, may be located in one place, or may be distributed to a plurality of network units. Some or all of the modules may be selected according to actual needs to achieve the purpose of the solution of the present disclosure. A person of ordinary skill in the art would understand and implement without creative efforts.

The above description is merely exemplary embodiments of the present disclosure, and is not intended to limit the present disclosure. Any modifications, equivalent replacements, improvements, etc. made within the spirit and principle of the present disclosure should be included within the scope of protection of the present disclosure.

The invention claimed is:

1. A method of preventing illegal attack, comprising:
when a user feature of a user is successfully identified, determining whether a living body detection result for the user feature indicates a failure or not;
in a case where the living body detection result for the user feature indicates failure, when a feature ID of the user feature is not locked and a locking condition of the feature ID is satisfied currently, locking the feature ID; and in a case where the living-body detection result for the user feature indicates success, when the feature ID of the user feature is locked and an unlocking condition of the locked feature ID is satisfied currently, unlocking the locked feature ID.

2. The method according to claim 1, wherein determining whether the locking condition of the feature ID is satisfied currently comprises:

determining whether the feature ID is the same as a second feature ID of a second user feature for which a latest locally recorded living body detection indicates failure;

when the feature ID is different from the second feature ID, determining that the locking condition of the feature ID is not satisfied;

when the feature ID is the same as the second feature ID, updating a count of a locally existing living-body-detection failure counter corresponding to the feature ID by increasing it with a first set value;

when the updated count is greater than or equal to a first preset threshold, determining that the locking condition of the feature ID is satisfied currently;

when the updated count is less than the first preset threshold, determining that the locking condition of the feature ID is not satisfied currently.

3. The method according to claim 2, when the feature ID is different from the second feature ID of the second user feature for which a latest locally recorded living body detection indicates failure, further comprising:

detecting whether a living-body-detection failure counter corresponding to the feature ID locally exists;

when the living-body-detection failure counter does not locally exist, establishing locally the living-body-detection failure counter corresponding to the feature ID, and setting a count of the living-body-detection failure counter to a second set value;

when the living-body-detection failure counter locally exists, setting the count of the living-body-detection failure counter corresponding to the feature ID to the second set value.

4. The method according to claim 1, wherein detecting whether the unlocking condition of the feature ID is satisfied currently comprises:

determining whether the feature ID is the same as a third feature ID of a third user feature for which a latest locally recorded living body detection indicates success;

when the feature ID is different from the third feature ID, determining that the unlocking condition of the feature ID is not satisfied;

when the feature ID is the same as the third feature ID, updating a count of a locally existing living-body-detection success counter corresponding to the feature ID by increasing it with a first set value;

when the updated count is greater than or equal to a second preset threshold, determining that the unlocking condition of the feature ID is satisfied currently;

when the updated count is less than the second preset threshold, determining that the unlocking condition of the feature ID is not satisfied currently.

5. The method according to claim 4, when the feature ID is different from the third feature ID of the third user feature for which a latest locally recorded living body detection indicates success, further comprising:

detecting whether a living-body-detection success counter corresponding to the feature ID locally exists;

when the living-body-detection success counter does not locally exist, establishing locally the living-body-detection success counter corresponding to the feature ID, and setting a count of the living-body-detection failure counter to a second set value;

when the living-body-detection success counter locally exists, setting the count of the living-body-detection success counter corresponding to the feature ID to the second set value.

6. The method according to claim 1, further comprising:

after locking the feature ID, starting a timer corresponding to the feature ID; and unlocking the feature ID when the timer reaches a set time threshold.

7. The method according to claim 6, further comprising:

resetting the timer corresponding to the feature ID, when the user feature of the user is successfully identified, the living body detection result for the user feature indicates failure, and the feature ID of the user feature is locked.

8. An electronic device comprising:

a processor, a memory configured to store machine executable instructions executable by the processor, an internal bus, and a communication interface;

wherein the processor, the communication interface and the memory communicate with each other via the internal bus, upon execution of the instructions, the processor is configured to;

identify a user feature of a user;

perform a living body detection on the user feature; and in a case where the user feature of the user is successfully identified, and a living body detection result for the user feature indicates failure, when a feature ID of the user feature is not locked and a locking condition of the feature ID is satisfied currently, lock the feature ID; and in a case where the user feature of the user is successfully identified, and a living body detection result for the user feature indicates success, when the feature ID of the user feature is locked and an unlocking condition of the locked feature ID is satisfied currently, unlock the locked feature ID.

9. The device according to claim 8, wherein the processor is further configured to:

determine whether the feature ID is the same as a second feature ID of a second user feature for which a latest locally recorded living body detection indicates failure;

when the feature ID is different from the second feature ID, determine that the locking condition of the feature ID is not satisfied;

when the feature ID is the same as the second feature ID, update a count of a locally existing living-body-detection failure counter corresponding to the feature ID by increasing the count with a first set value;

when the updated count is greater than or equal to a first preset threshold, determine that the locking condition of the feature ID is satisfied currently; and when the updated count is less than the first preset threshold, determine that the locking condition of the feature ID is not satisfied currently.

10. The device according to claim 9, wherein the processor is further configured to:
  detect whether a living-body-detection failure counter corresponding to the feature ID locally exists, when the feature ID is different from the second feature ID of the second user feature for which a latest locally recorded living body detection indicates failure,
  when the living-body-detection failure counter does not locally exist,
    establish locally the living-body-detection failure counter corresponding to the feature ID, and
    set a count of the living-body-detection failure counter to a second set value; and
  when the living-body-detection failure counter locally exists, set the count of the living-body-detection failure counter corresponding to the feature ID to the second set value.

11. The device according to claim 8, wherein the processor is further configured to:
  determine whether the feature ID is the same as a third feature ID of a third user feature for which a latest locally recorded living body detection indicates success;
  when the feature ID is different from the third feature ID, determine that the unlocking condition of the feature ID is not satisfied;
  when the feature ID is the same as the third feature ID,
    update a count of a locally existing living-body-detection success counter corresponding to the feature ID by increasing it with a first set value;
    when the updated count is greater than or equal to a second preset threshold, determine that the unlocking condition of the feature ID is satisfied currently; and
    when the updated count is less than the second preset threshold, determine that the unlocking condition of the feature ID is not satisfied currently.

12. The device according to claim 11, wherein the processor is further configured to:
  when the feature ID is different from the third feature ID of the third user feature for which a latest locally recorded living body detection indicates success, detect whether a living-body-detection success counter corresponding to the feature ID locally exists,
  when the living-body-detection success counter does not locally exist,
    establish locally the living-body-detection success counter corresponding to the feature ID, and
    set a count of the living-body-detection failure counter to a second set value; and
  when the living-body-detection success counter locally exists, set the count of the living-body-detection success counter corresponding to the feature ID to the second set value.

13. The device according to claim 8, wherein, the processor is further configured to:
  start a timer corresponding to the feature ID after locking the feature ID, and
  unlock the feature ID when the timer reaches a set time threshold.

14. The device according to claim 13, wherein, the processor is further configured to:
  reset the timer corresponding to the feature ID when the feature identifying module successfully identifies the user feature of the user, the living body detection of the living body detecting module indicates failure, and the feature ID of the user feature is locked.

* * * * *